United States Patent [19]

Nakayama

[11] Patent Number: 5,079,675
[45] Date of Patent: Jan. 7, 1992

[54] SURFACE ILLUMINATING APPARATUS
[75] Inventor: Kouichi Nakayama, Kofu, Japan
[73] Assignee: Deilaito Co., Ltd., Tokyo, Japan
[21] Appl. No.: 610,869
[22] Filed: Nov. 8, 1990
[51] Int. Cl.⁵ ............................................. F21V 5/02
[52] U.S. Cl. ..................................... 362/31; 362/26; 362/27; 362/331
[58] Field of Search ................ 362/26, 27, 29, 30, 362/31, 97, 244, 330, 331, 332

[56] References Cited

U.S. PATENT DOCUMENTS

| 2,623,313 | 12/1952 | Fuchs | 362/27 |
| 2,671,163 | 3/1954 | Minter | 362/26 |
| 2,831,453 | 4/1958 | Hardesty | 362/26 |
| 4,765,701 | 8/1988 | Cheslak | 362/26 |
| 4,918,577 | 4/1990 | Furudate | 362/26 |
| 4,947,300 | 8/1990 | Wen | 362/31 |

FOREIGN PATENT DOCUMENTS

| 2754618 | 6/1979 | Fed. Rep. of Germany | 362/26 |
| 2536504 | 5/1984 | France | 362/26 |
| 952388 | 3/1964 | United Kingdom | 362/31 |

Primary Examiner—Ira S. Lazarus
Assistant Examiner—Y. Quach
Attorney, Agent, or Firm—Jordan and Hamburg

[57] ABSTRACT

The present invention relates to a surface illuminating apparatus for illuminating an object or a space in a room or the like and an object of the invention is to provide a surface illuminating apparatus in which an illuminance can be increased and can be made uniform and a transparent plate can be made thin. The surface illuminating apparatus according to the invention comprises: at least one laminated flat plate-like transparent plate; a first reflecting unit arranged on one surface of the transparent plate; at least one light source arranged near side edge portions of the transparent plate; a second reflecting unit arranged around the light source; and a plurality of groove portions which are formed on the surface of the transparent plate on the side opposite to the first reflecting unit and each of which is constructed by two inclined surfaces, wherein inclination angles of the inclined surfaces of the groove portion on the side opposite to the light source to the transparent plate are set to values within a range such that the lights which enter from the light source into the transparent plate in parallel with the surface thereof are totally reflected by the inclined surfaces and the totally reflected lights are not totally reflected by the other surface of the transparent plate.

6 Claims, 4 Drawing Sheets

SURFACE ILLUMINATING APPARATUS

FIELD OF THE INVENTION

The present invention relates to a surface illuminating apparatus and, more particularly, to a surface illuminating apparatus for illuminating an object or a space in a room or the like.

DESCRIPTION OF THE RELATED BACKGROUND ART

Hitherto, surface illuminating apparatuses have generally widely been used for the indirect illumination in a room, signboards, display devices of various kinds of apparatuses, and the like. Among the above surface illuminating apparatuses, there is well known an apparatus such that a fluorescent lamp as a line light source or an incandescent lamp as a point light source is arranged on the back surface of a light diffusing plate and the light illumination is executed.

However, in such a surface illuminating apparatus, since a light amount differs depending on a distance from a light source arranged on the back surface of the light diffusing plate, it is difficult to obtain a surface illumination of a uniform brightness. To solve the above drawback, there has been proposed a surface illuminating apparatus comprising a flat plate-like transparent plate and the light sources arranged on both sides of the transparent plate. According to such an illuminating apparatus, by brushing one surface of the transparent plate, a number of concave and convex portions are formed on one surface of the transparent plate, the light from a light source is diffused and reflected by the concave and convex portions to thereby obtain an almost planar light source. According to the above surface illuminating apparatus, although the uniformity is improved, a large amount of reflected lights by the concave and convex portions formed on the surface of the transparent plate are not used for illumination and the illuminance is small, and a variation in illuminance easily occurs. Therefore, there is a drawback such that a thickness of transparent plate cannot be made thin.

SUMMARY OF THE INVENTION

It is an object of the present invention to provide an illuminating apparatus in which the illuminance is increased and is made uniform and a transparent plate can be made thin.

According to an embodiment of the invention, there is provided an illuminating apparatus comprising: one or a plurality of laminated flat plate-like transparent plates; a reflecting plate arranged on one surface of the transparent plates; at least one light source arranged near side edge portions of the transparent plates; reflecting barrels arranged around the light sources; and a plurality of groove portions which are formed on the surface of the transparent plates on the side opposite to the reflecting plate and each of which is constructed by two inclined surfaces, wherein inclination angles of the inclined surfaces which face the light sources to the surface of the transparent plates are set to values within a range such that lights which enter from the light sources into the transparent plates in parallel with the surface thereof are totally reflected by the inclined surfaces and the totally reflected lights are not totally reflected by the other surface of the transparent plates.

According to another embodiment of the invention, there is provided an illuminating apparatus comprising: one or a plurality of laminated flat plate-like transparent plates; a reflecting plate arranged on one surface of the transparent plates; a light source arranged near one side edge portion of the transparent plates; a reflecting barrel arranged around the light source; and a plurality of groove portions which are formed on the surface of the transparent plates on the side of the reflecting plate and each of which is constructed by two inclined surfaces, wherein an inclination angle of the inclined surface of the groove portion on the side opposite to the light source to the surface of the transparent plates is set to a value within a range such that a light which enters from the light source to the transparent plates in parallel with the surface thereof is totally reflected by the inclined surface and the totally reflected light is not totally reflected by the other surface of the transparent plates, and an inclination angle of the inclined surface of the groove portion on the side which does not face the light source to the surface of the transparent plates is set to almost 90°.

According to further another embodiment of the invention, there is provided an illuminating apparatus comprising: one or a plurality of laminated flat plate-like transparent plates; a reflecting plate arranged on one surface of the transparent plates; light sources arranged near both side edge portions of the transparent plates; reflecting barrels arranged around the light sources; and a plurality of groove portions which are formed on the surface of the transparent plates on the side opposite to the reflecting plate and each of which is constructed by two inclined surfaces, wherein an inclination angle of the inclined surface of the groove portion on the side opposite to the light sources to the surface of the transparent plates is set to a value within a range such that a light which enters from the near light source into the transparent plates in parallel with the surface thereof is totally reflected and the totally reflected light is not totally reflected by the other surface of the transparent plates, and an inclination angle of the inclined surface of the groove portion on the side opposite to the remote light source to the surface of the transparent plates is set to almost 90°.

With the above constructions, according to the illuminating apparatuses of the intention, a rate at which the light from the light source is reflected by the inclined surfaces of the groove portions of the transparent plate(s) in the direction which is effective for illumination is large and the light from the light source can be effectively scattered. Therefore, the illuminance can be increased and the transparent plates can be made thin.

DESCRIPTION OF THE PREFERRED EMBODIMENTS

Embodiments of the present invention will be described in detail hereinbelow with reference to the drawings.

Figure 1:
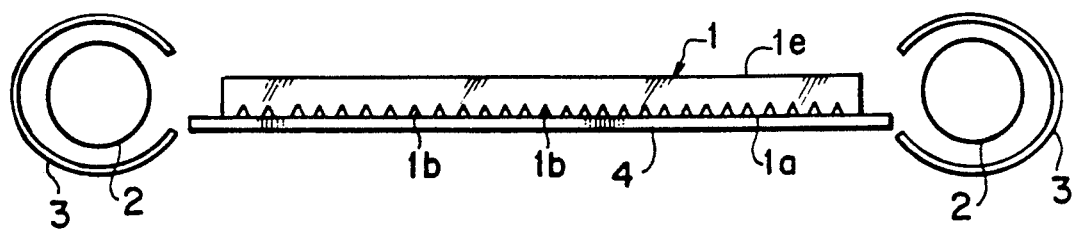
FIG. 1 is a plan view showing an embodiment of an illuminating apparatus according to the invention.

FIG. 1 is a plan view showing an embodiment of an illuminating apparatus according to the invention. A flat-plate like transparent plate 1 is made of an acrylic plate, a glass plate, or the like. Light sources 2 are arranged near both edge portions of the transparent plate 1. The light sources 2 are constructed by fluorescent lamps shown in the diagram, halogen lamps, or the like. Reflecting barrels 3 to reflect the lights from the light sources 2 toward the transparent plate 1 are arranged around the light sources 2.

Figure 2:
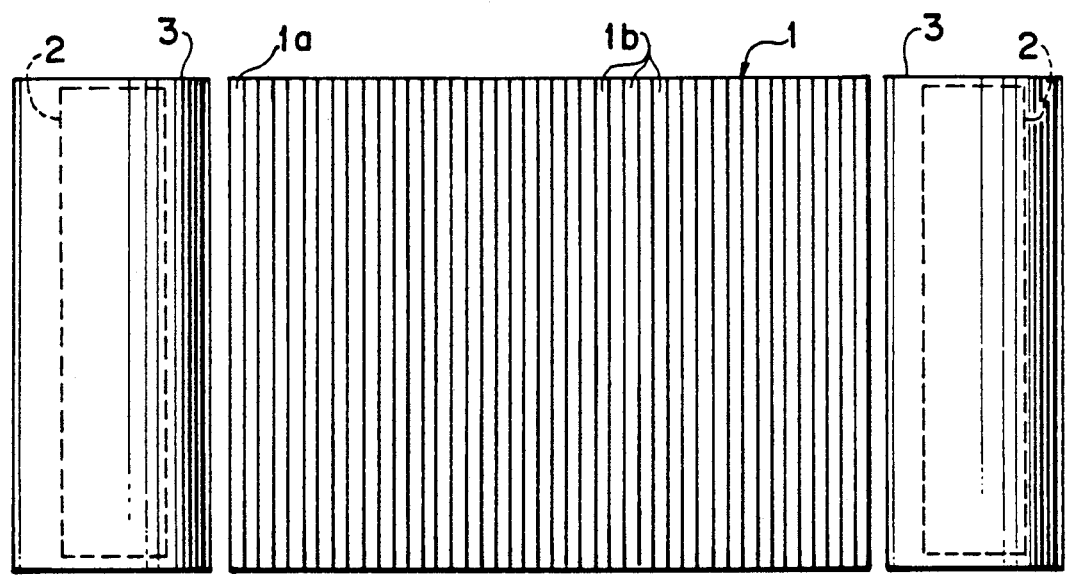
FIG. 2 is a rear view showing the main section of the illuminating apparatus shown in FIG. 1.
Figure 3:
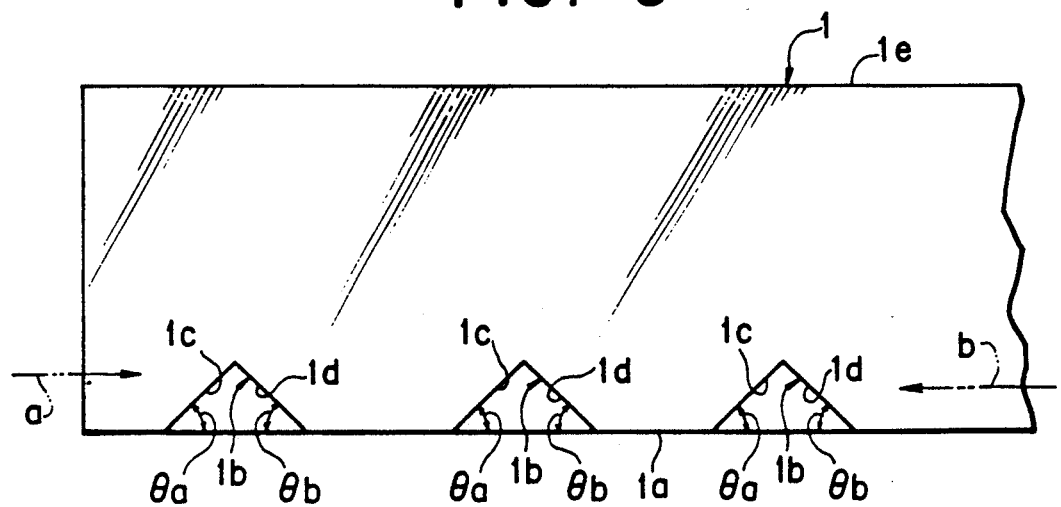
FIG. 3 is a partial enlarged diagram of a transparent plate of the illuminating apparatus shown in FIG. 1.

As shown in FIG. 2, a plurality of groove portions 1b are formed on one surface 1a of the transparent plate 1. As shown in FIG. 3, each of the groove portions 1b is formed by two inclined surfaces 1c and 1d. Angles $\theta_a$ and $\theta_b$ of inclination of the inclined surfaces 1c and 1d of the groove portion 1b on the side opposite to the light sources 2 to one surface 1a of the transparent plate 1 are set into values within a range such that lights a and b which enter from the light sources 2 into the transparent plate 1 in parallel with the surface 1a thereof are totally reflected by the inclined surfaces 1c and 1d and the totally reflected lights are not totally reflected by the other surface 1e of the transparent plate 1.

A reflecting plate 4 is arranged on the side of the surface 1a of the transparent plate 1 on which the groove portions 1b are formed. A color of the reflecting plate 4 is determined in accordance with the application. A reflecting mirror can be also arranged in place of the reflecting plate 4.

Figure 4:
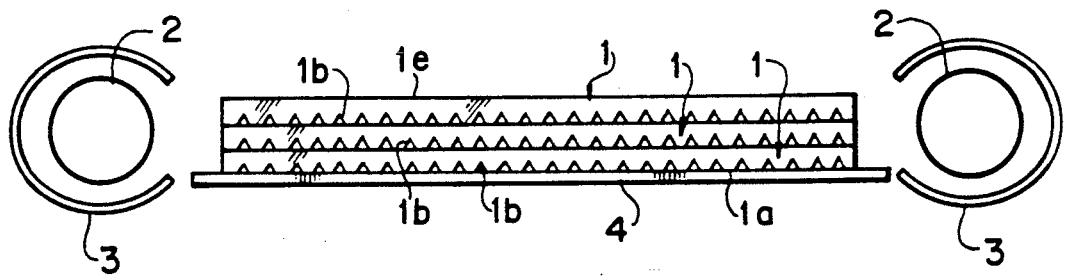
FIGS. 4 and 5 are plan views showing other embodiments of an illuminating apparatus according to the invention.

FIG. 4 shows an embodiment in which a plurality of transparent plates 1 are laminated. By laminating a plurality of transparent plates 1, a total area of the inclined surfaces 1c and 1d to reflect the lights from the light sources 2 can be increased and a degree to scatter the lights from the light sources 2 can be enlarged. Therefore, the illuminance of the surface 1e of the transparent plates 1 through which the lights transmit can be further increased and can be made further uniform. The reflecting plate 4 is arranged on the side of the surface 1a of the lowest transparent plate 1 on which the groove portions 1b are formed.

In the illuminating apparatuses shown in FIGS. 1 to 4, the light source 2 can be also arranged only near one side edge portion of the laminate of the transparent plates 1.

An embodiment shown in FIG. 5 will now be described.

Figure 5:
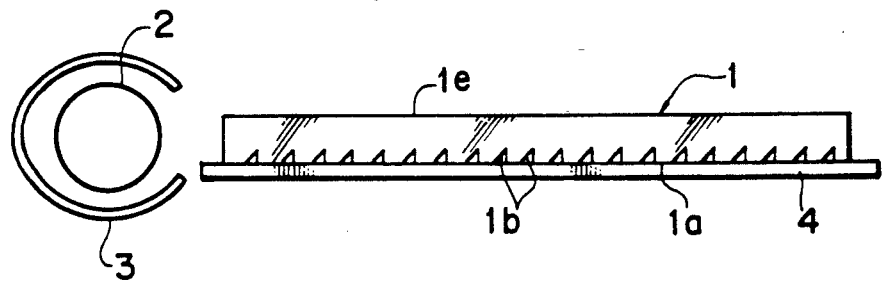

As shown in FIG. 5, the light source 2 is arranged near one side edge portion of the transparent plate 1. The reflecting barrel 3 to reflect the light from the light source 2 toward the transparent plate 1 is arranged around the light source 2. A plurality of groove portions 1b are formed on one surface 1a of the transparent plate 1. Each of the groove portions 1b is constructed by two inclined surfaces 1c and 1f. The reflecting plate 4 is arranged on the side of the surface 1a of the transparent plate 1 on which the groove portions 1b are formed.

Figure 6:
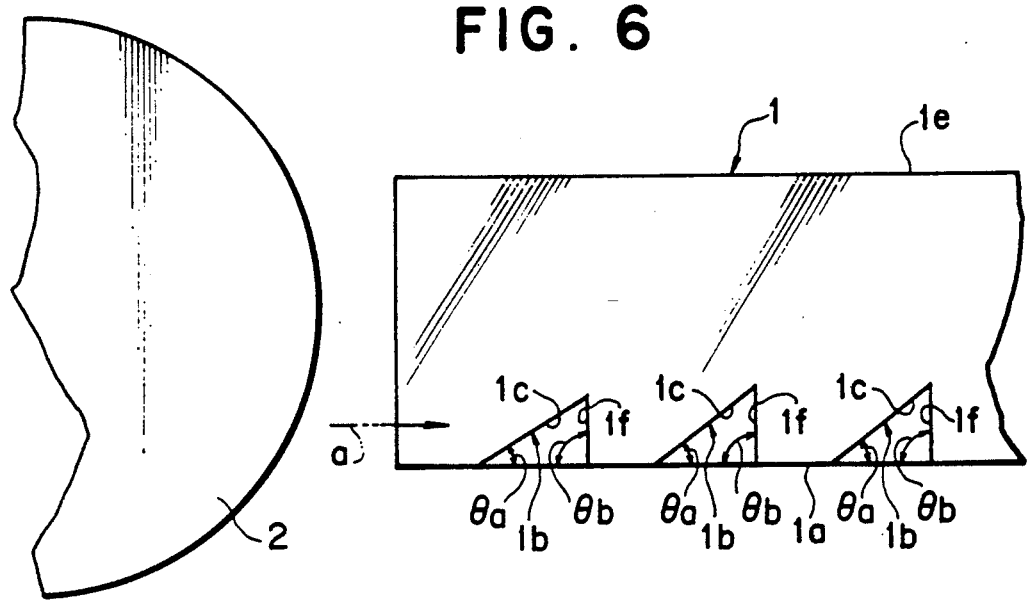
FIG. 6 is a partial enlarged diagram of a transparent plate of the illuminating apparatus shown in FIG. 5.

As shown in FIG. 6, the inclination angle $\theta_a$ of the inclined surface 1c of the groove portion 1b on the side opposite to the light source 2 to the surface 1a of the transparent plate 1 is set to a value within a range such that the light a which enters from the light source 2 into the transparent plate 1 in parallel with the surface 1a thereof is totally reflected by the inclined surface 1c and the totally reflected light is not totally reflected by the other surface 1e of the transparent plate 1. The inclination angle $\theta_b$ of an inclined surface 1f of the groove portion 1b on the side which does not face the light source 2 to the surface 1a of the transparent plate 1 is set to almost 90°.

Figure 7:
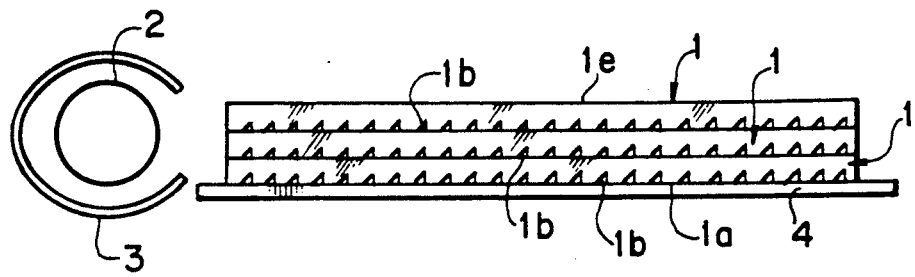
FIGS. 7 and 8 are plan views showing further other embodiments of an illuminating apparatus according to the invention.

FIG. 7 shows an embodiment in which a plurality of transparent plates 1 are laminated. By laminating a plurality of transparent plates 1, the illuminance of the surface 1e of the transparent plate 1 through which the light transmits can be further increased as mentioned above and the inclined surfaces 1f of the groove portions 1b do not downwardly reflect the lights which are input from the lower position. Therefore, the illuminance can be made further uniform. The reflecting plate 4 is arranged on the side of the surface 1a of the laminate of the transparent plates 1 on which the groove portions 1b are formed.

An embodiment shown in FIG. 8 will now be described.

Figure 8:
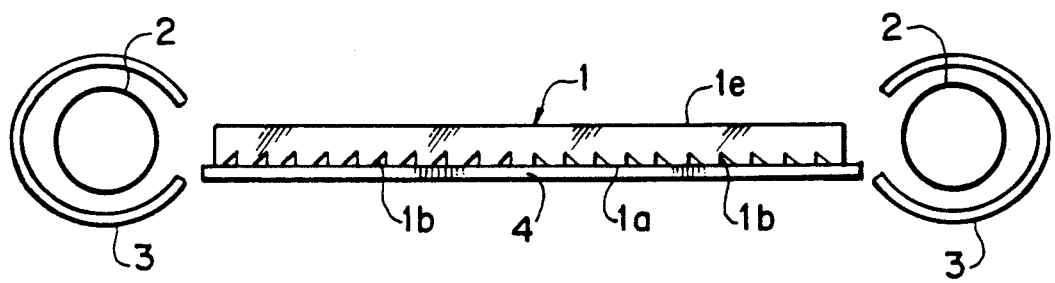
Figure 9:
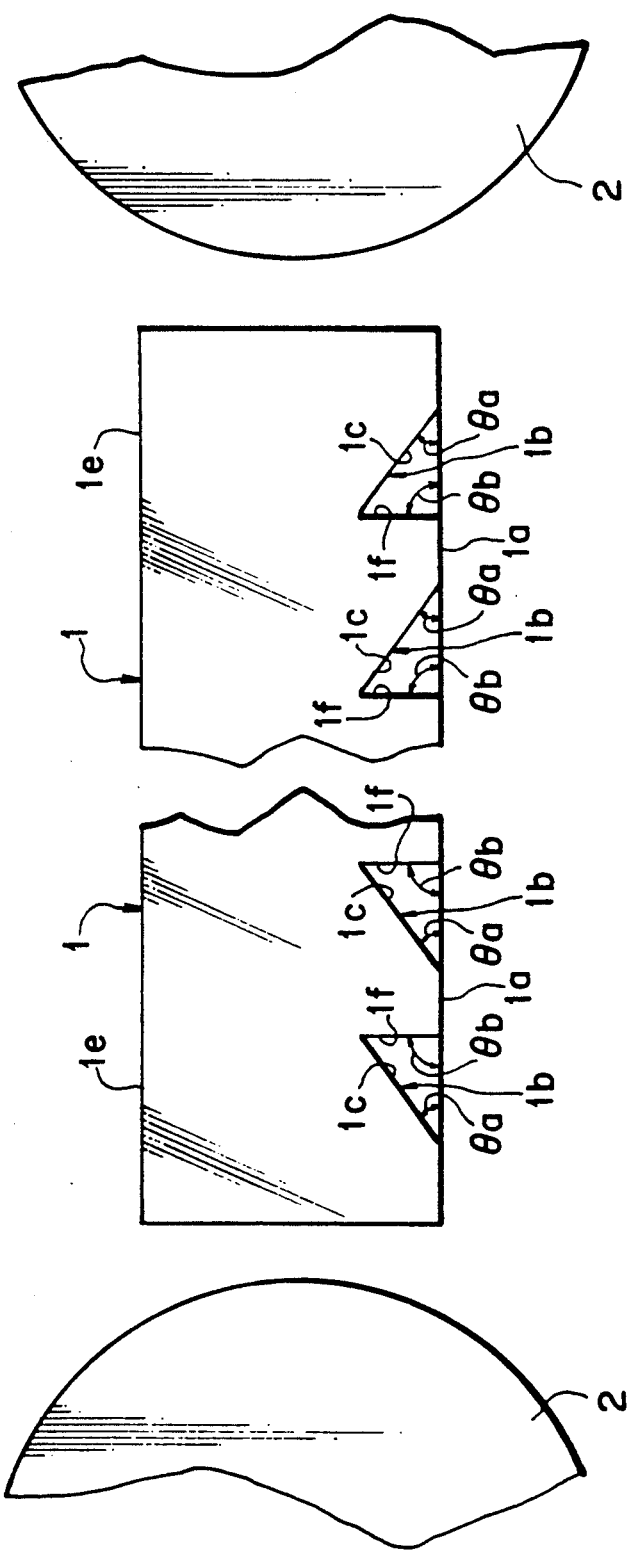
FIG. 9 is a plan view with a part cut away and enlargedly shows the main section of the illuminating apparatus shown in FIG. 8.

As shown in FIG. 8, the light sources 2 are arranged near both side edge portions of the transparent plate 1. The reflecting barrels 3 to reflect the lights from the light sources 2 toward the transparent plate 1 are arranged around the light source 2. A plurality of groove portions 1b are formed on one surface 1a of the transparent plate 1. Each of the groove portions 1b is constructed by two inclined surfaces 1c and 1f. The reflecting plate 4 is arranged on the side of the surface 1a of the transparent plate 1 on which the groove portions 1b are formed. As shown in FIG. 9 the inclination angle $\theta_a$ of the inclined surface 1c of the groove portion 1b on the side opposite to the near light source 2 to the surface 1a of the transparent plate 1 is set to a value within a range such that the light which enters from the near light source 2 into the transparent plate 1 in parallel with the surface 1a thereof is totally reflected and the totally reflected light is not totally reflected by the other surface 1e. The inclination angle $\theta_b$ of the inclined surface 1f of the groove portion 1b on the side opposite to the remote light source 2 to the surface 1a of the transparent plate 1 is set to almost 90°.

Figure 10:
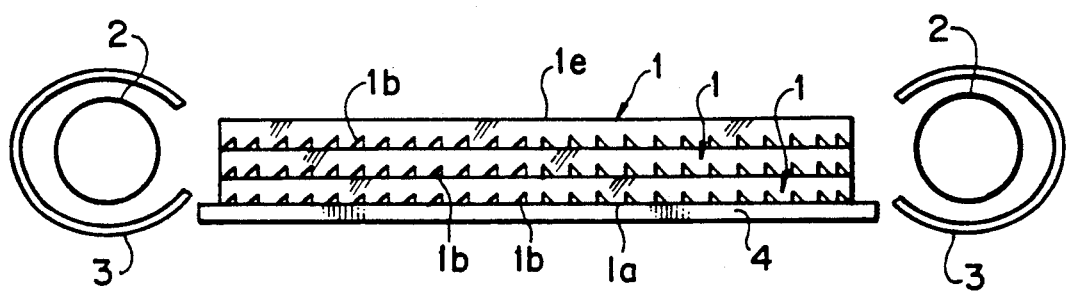
FIG. 10 is a plan view showing further another embodiment of an illuminating apparatus according to the invention.

FIG. 10 shows an embodiment in which a plurality of transparent plates 1 are laminated. By laminating a plurality of transparent plates 1, the illuminance of the surface 1e of the transparent plates 1 through which the light transmits can be further increased and can be made further uniform. The reflecting plate 4 is arranged on the side of the surface 1a of the laminate of the transparent plates 1 on which the groove portions 1b are formed.

What is claimed is:

1. A surface illuminating apparatus comprising:
   at least one flat plate-like transparent plate;
   a first reflecting unit arranged on one surface of the transparent plate;
   a light source arranged near one side edge portion of the transparent plate;

a second reflecting unit arranged around the light source; and a plurality of groove portions which are formed on the surface of the transparent plate on the side of the first reflecting unit and each of which is constructed by two inclined surfaces, wherein an inclination angle of the inclined surface of the groove portion on the side opposite to the light source to the surface of the transparent plate is set to a value within a range such that a light which enters from the light source into the transparent plate in parallel with the surface thereof is totally reflected by the inclined surface and the totally reflected light is not totally reflected by the other surface of the transparent plate, and an inclination angle of the inclined surface of the groove portion on the side which does not face the light source to the surface of the transparent plate is set to almost 90°.

2. An apparatus according to claim 1, wherein the first reflecting unit is a reflecting plate.

3. An apparatus according to claim 1, wherein the second reflecting unit is a reflecting barrel.

4. A surface illuminating apparatus comprising:
at least one flat plate-like transparent plate;
a first reflecting unit arranged on one surface of the transparent plate;
light sources arranged near both side edge portions of the transparent plate;
second reflecting units arranged around the light sources; and
a plurality of groove portions which are formed on the surface of the transparent plate on the side of the first reflecting unit and each of which is constructed by two inclined surfaces, wherein an inclination angle of the inclined surface of the groove portion on the side opposite to the light source to the surface of the transparent plate is set to a value within a range such that a light which enters from the near light source into the transparent plate in parallel with the surface thereof is totally reflected and the totally reflected light is not totally reflected by the other surface of the transparent plate, and an inclination angle of the inclined surface of the groove portion on the side opposite to the remote light source to the surface of the transparent plate is set to almost 90°.

5. An apparatus according to claim 4, wherein the first reflecting unit is a reflecting plate.

6. An apparatus according to claim 4, wherein the second reflecting unit is a reflecting barrel.

* * * * *